US006814510B1

(12) United States Patent
Sabbagh et al.

(10) Patent No.: US 6,814,510 B1
(45) Date of Patent: Nov. 9, 2004

(54) METHOD AND APPARATUS FOR AUTOMATIC UPDATE OF A PRINTER DRIVER CONFIGURATION AND STATUS

(75) Inventors: Raymond J. Sabbagh, Harbor City, CA (US); May G. Onaga, Cypress, CA (US); Likang Guo, Rochester, NY (US); Evral E. Bodden, Hawthorne, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/631,869

(22) Filed: Aug. 2, 2000

(51) Int. Cl.[7] .................................................. B41J 11/44
(52) U.S. Cl. ............................. 400/63; 400/61; 400/70; 400/76
(58) Field of Search ............................. 400/63, 74, 61, 400/70, 76; 358/1.16

(56) References Cited

U.S. PATENT DOCUMENTS

| | | | | |
|---|---|---|---|---|
| 5,580,177 A | * | 12/1996 | Gase et al. ................. | 358/1.15 |
| 5,625,757 A | * | 4/1997 | Kageyama et al. .......... | 358/1.14 |
| 5,995,723 A | * | 11/1999 | Sperry et al. .............. | 358/1.13 |
| 6,094,548 A | * | 7/2000 | Gunning et al. ............... | 399/15 |
| 6,094,679 A | * | 7/2000 | Teng et al. .................. | 709/217 |
| 6,125,372 A | * | 9/2000 | White ......................... | 707/205 |
| 6,246,485 B1 | * | 6/2001 | Brown et al. ............... | 358/1.13 |
| 6,292,849 B1 | * | 9/2001 | Kimura et al. ............... | 709/315 |
| 6,301,012 B1 | * | 10/2001 | White et al. ................ | 358/1.15 |
| 6,333,790 B1 | * | 12/2001 | Kageyama .................. | 358/1.15 |
| 6,341,832 B1 | * | 1/2002 | Narushima ................... | 347/14 |
| 6,452,692 B1 | * | 9/2002 | Yacoub ....................... | 358/1.15 |
| 2003/0084132 A1 | * | 5/2003 | Ohta ........................... | 709/221 |
| 2003/0137688 A1 | * | 7/2003 | Lawrence et al. .......... | 358/1.15 |

FOREIGN PATENT DOCUMENTS

| | | | | |
|---|---|---|---|---|
| EP | 0809176 A2 | * | 11/1997 | ............. G06F/3/12 |
| EP | 0 952 513 A1 | | 10/1999 | |
| JP | 410198567 A | * | 7/1998 | ............. G06F/3/12 |
| JP | 411327828 A | * | 11/1999 | ............. G06F/3/12 |
| JP | 2000099286 A | * | 4/2000 | ............. G06F/3/12 |
| JP | 2001051810 A | * | 2/2001 | ............. G06F/3/12 |
| JP | 2002323964 A | * | 11/2002 | ............. G06F/3/12 |

* cited by examiner

*Primary Examiner*—Charles H. Nolan, Jr.
(74) *Attorney, Agent, or Firm*—Kent Chen

(57) ABSTRACT

A method and apparatus for updating print drivers is described. The described system includes a port monitor that monitors the configuration and status of a printer. When changes occur to the configuration of a printer, the port monitor updates a print driver registry on the print server. The port monitor also wakes the print driver on the print server and informs the print driver of the configuration changes. Depending on the client operating system used, a client device connected to the server's shared print queue may either directly read or request the configuration data from the print server. In some client operating systems, the client device may also update a local registry on the client device to reflect the changes in configuration of the printer. The described system allows print drivers to have a consistent interface to printer configuration and status data regardless of which version of the Microsoft Windows Operating System is used by the each.

25 Claims, 6 Drawing Sheets

METHOD AND APPARATUS FOR AUTOMATIC UPDATE OF A PRINTER DRIVER CONFIGURATION AND STATUS

BACKGROUND OF THE INVENTION

Print drivers have long been used to format and transfer computer data from a source of data such as a computer to an output device such as a printer. However, because printers from different manufactures typically have different software and hardware configurations, print drivers typically need to be customized to match the particular printer configuration. Users enter relevant data into the computer to customize the print drivers.

User entry of printer customization data can be time consuming, and is prone to user error. Thus bi-directional drivers that are capable of receiving and processing printer status and configuration data have been implemented.

However, the most widely used operating system, the Windows operating system from Microsoft Corporation of Redmond, Wash., are not designed to support bi-directional drivers. Current implementations of bi-directional drivers in Microsoft OS systems circumvent the spooler to enable data flow in two directions. Circumventing the spooler does not conform to Microsoft specifications. Failure to conform to Microsoft specifications creates problems regardless of the Windows operating system used. In Windows NT systems where many clients communicate to printers through a print server, the avoidance of the print spooler prevents the updating of printer information in the print server because typically, only a system administrator may change the printer configuration settings in the printer server. In Windows 95 and Windows 98 systems that utilize a print server, the print server data is not updated because Windows assumes that the print configuration data is local client data and thus fails to update the print server.

Thus an improved bi-directional print driver is needed.

DETAILED DESCRIPTION OF THE INVENTION

Figure 1:
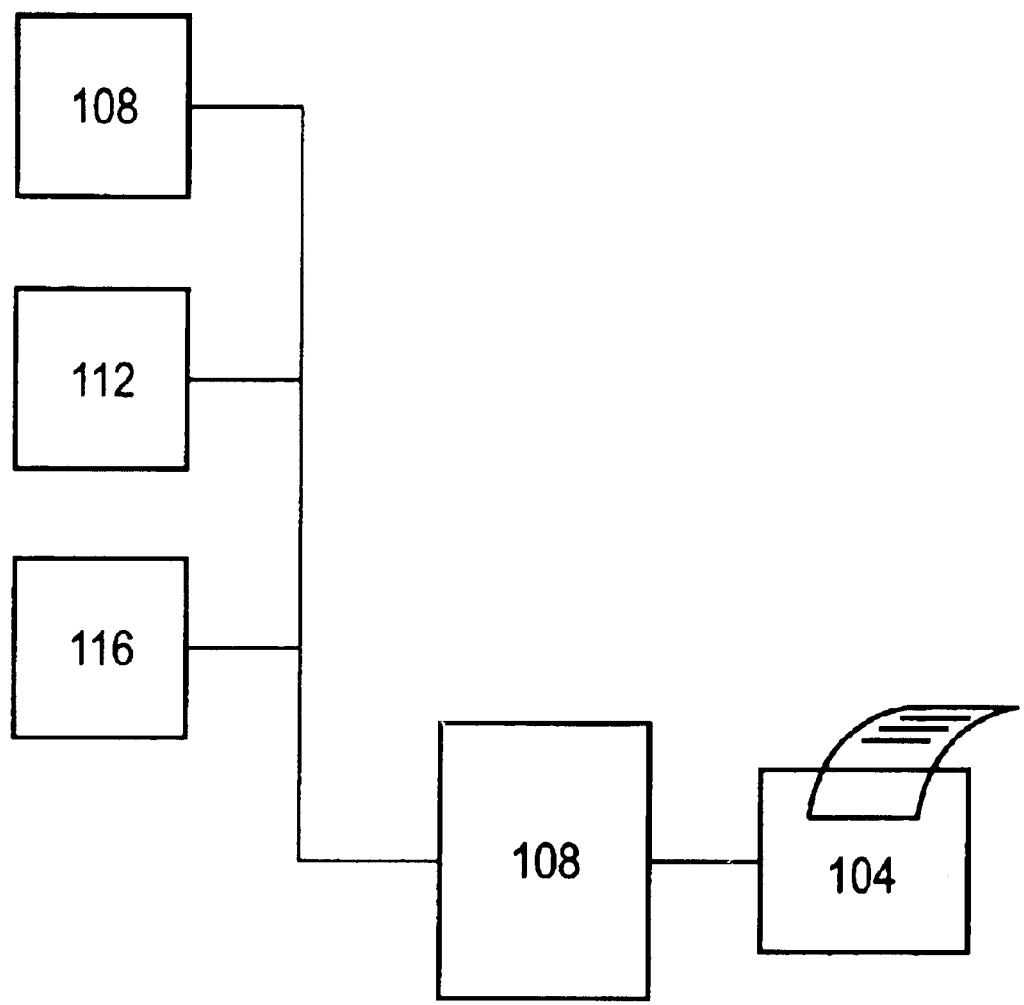
FIG. 1 shows a networked system including a client device that communicates with a printer through a print server.

FIG. 1 illustrates a networked system including a printer 104 that is coupled to a print server 108. Print server 108 transfers data to be printed from multiple clients 108, 112, 116 to printer 104. Print server 108 also transfers printer data, including printer status and configuration data, from printer 104 to clients 108, 112, 116.

In order to control the flow of data, a local spooler program runs in each client 108, 112, 116. In one embodiment, the spooler program is part of an operating system such as Windows 98 or Windows NT from Microsoft Corporation of Redmond Wash. A user installed port driver in a port monitor interfaces with the print spooler to convert the data from the print spooler into a format suitable for a corresponding printer. For example, when communicating with printers made by Xerox Corporation of Stamford, Conn., a Xerox TCP/IP port monitor may be installed on the server computer to enable formatting of documents to conform to a LPR or Port 9100 protocol. The print monitor maintains data on printer configuration and printer status. Examples of printer configuration data include information on printer set ups such as duplex information, tray and envelope information that may indicate paper sizes and colors, preprinted header information on the paper and the like. Examples of printer status data include information on whether the toner is low or whether a paper jam exists in the printer. For purposes of this application, the term "summary printer data" will be used to include both printer configuration data and printer status data Single direction print monitors only allow data flow from the client computer to the printer. Thus updates to printer configuration or status are manually entered by the end user. As previously discussed, such data entry is prone to errors. Bi-directional print monitors enable a printer to automatically update monitor data. However, the Microsoft spooler architecture in Windows NT and Windows 98 was not designed to support bi-directional print monitors. Thus, in current embodiments of bi-directional print monitors operating in a Microsoft operating systems, the print device driver obtains the IP address of the printer and directly addresses the printer circumventing the operating system print spooler.

Circumventing the operating system print spooler breaks operating system protocols for the current generation of Microsoft Windows operating systems. Furthermore, circumventing the operating system print spooler creates additional problems in Windows NT networks that utilize print servers to maintain and monitor printer settings. In particular, when a print server is used to maintain printer settings, client computers connected to the print server are unable to change or otherwise update the stored printer configuration settings because typically only a print server administrator is authorized to change print server local configurations.

Figure 2:
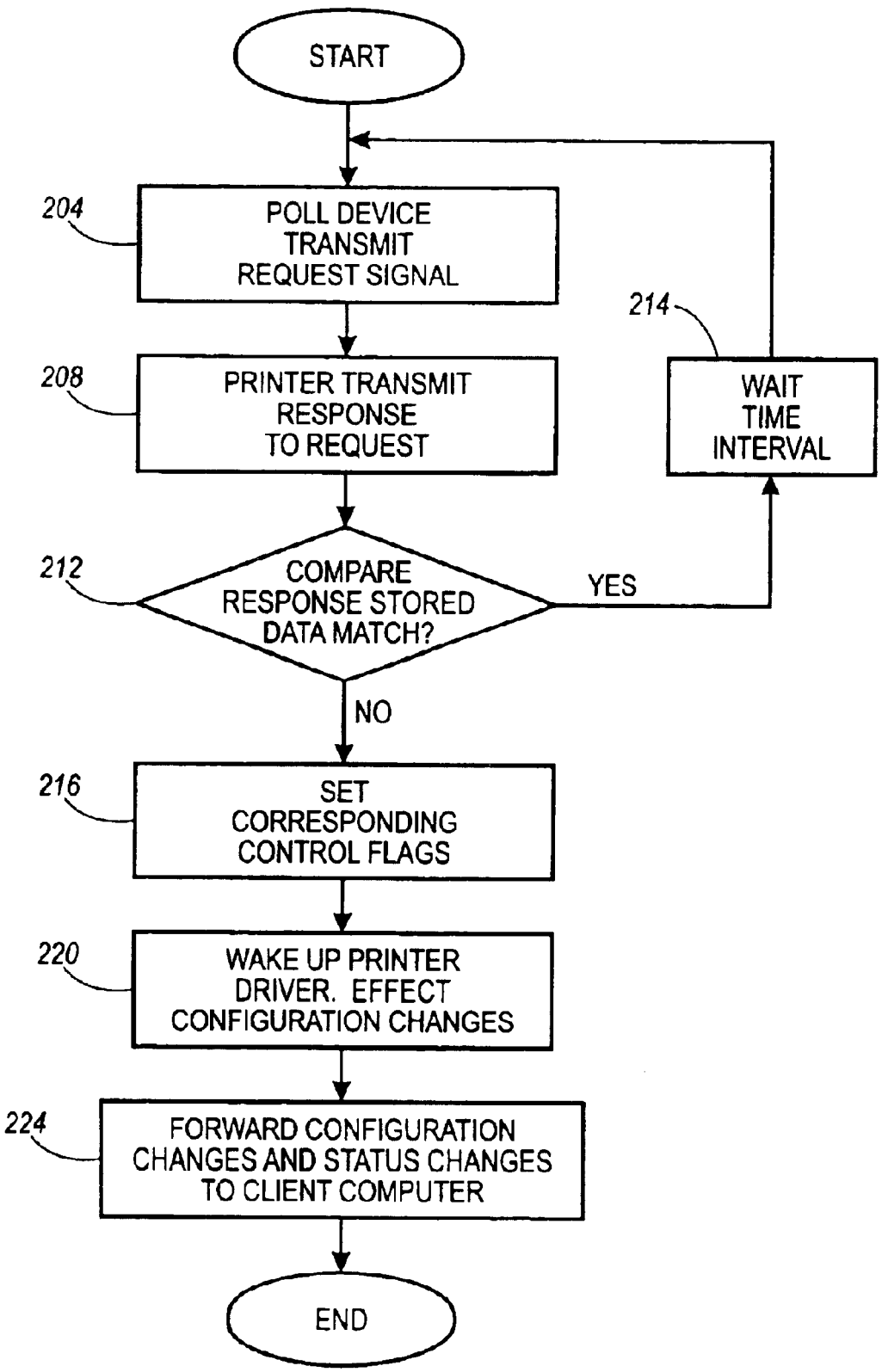
FIG. 2 is a flowchart that illustrates operation of a bi-directional print driver in a data "push" configuration.

In order to implement a bi-directional print driver in a Microsoft Windows operating system and allow upgrading of printer configurations in a print server, one embodiment of the current invention utilizes a polling method of updating data. FIG. 2 is a flow diagram illustrating the communication of data in a polling "push" architecture. In block 204, a poll device, which may be implemented in the port monitor, periodically transmits a request signal to the printer. A server administrator may set the time interval between periodic request signals. Typical printer data requests may include, but are not limited to, configuration and printer status data. Examples of printer configuration data include paper types, paper size, paper finishes (glossy or matte), and envelope trays. Printer status data typically describe a state of printer operation. Examples of printer status data include whether a printer is ready, that the printer is jammed, or that toner levels are low. In block 208, the printer transmits a response signal that answers the request signal. The response signal provides the requested data.

In block 212, a processor compares the printer data received in response to the poll request with stored data from previous poll requests. If the polled data matches the stored data, no change has occurred, no control flags are set, and the system waits a preset time interval in block 214 before transmitting another poll request. However, if the received data does not match the stored data, then a change in either printer status or printer configuration has occurred, and corresponding control flags are set in block 216. In one embodiment, a port monitor manager uses the control flag settings and the stored settings to direct future printer instructions. In an alternate embodiment, the port monitor manager may wake up the print driver to effect the configuration changes as shown in block 220.

When the polling device is implemented in a print server, the change in printer configuration or status may be "pushed" through the system. As used herein, the term "push" refers to transferring data back through the system from the printer to a print server, and from the print server to the client. In block 224, the print sever transmits printer configuration and printer status data changes to the client computers that originate printer instructions. One method of communicating such changes is by transmitting control flags.

In Windows NT operating systems from Microsoft, the preferred method of informing the print driver of configuration changes is by using the Print Driver Event API which is defined and described in the Windows NT DDK (Device Driver Kit) published by Microsoft of Redmond Wash. and which is hereby incorporated by reference. In operating systems in which the server registry is not assumed to be the local registry clients request that a Pipe Server thread be used to transfer the control flags or updated printer data from the server registry to the client computers. Examples of operating systems in which the server registry is not assumed to be the local registry include Windows 95 and Windows 98. Thus, in the previously described embodiment, client computers connected to the print server or a print queue automatically receive the updated settings.

Figure 3:
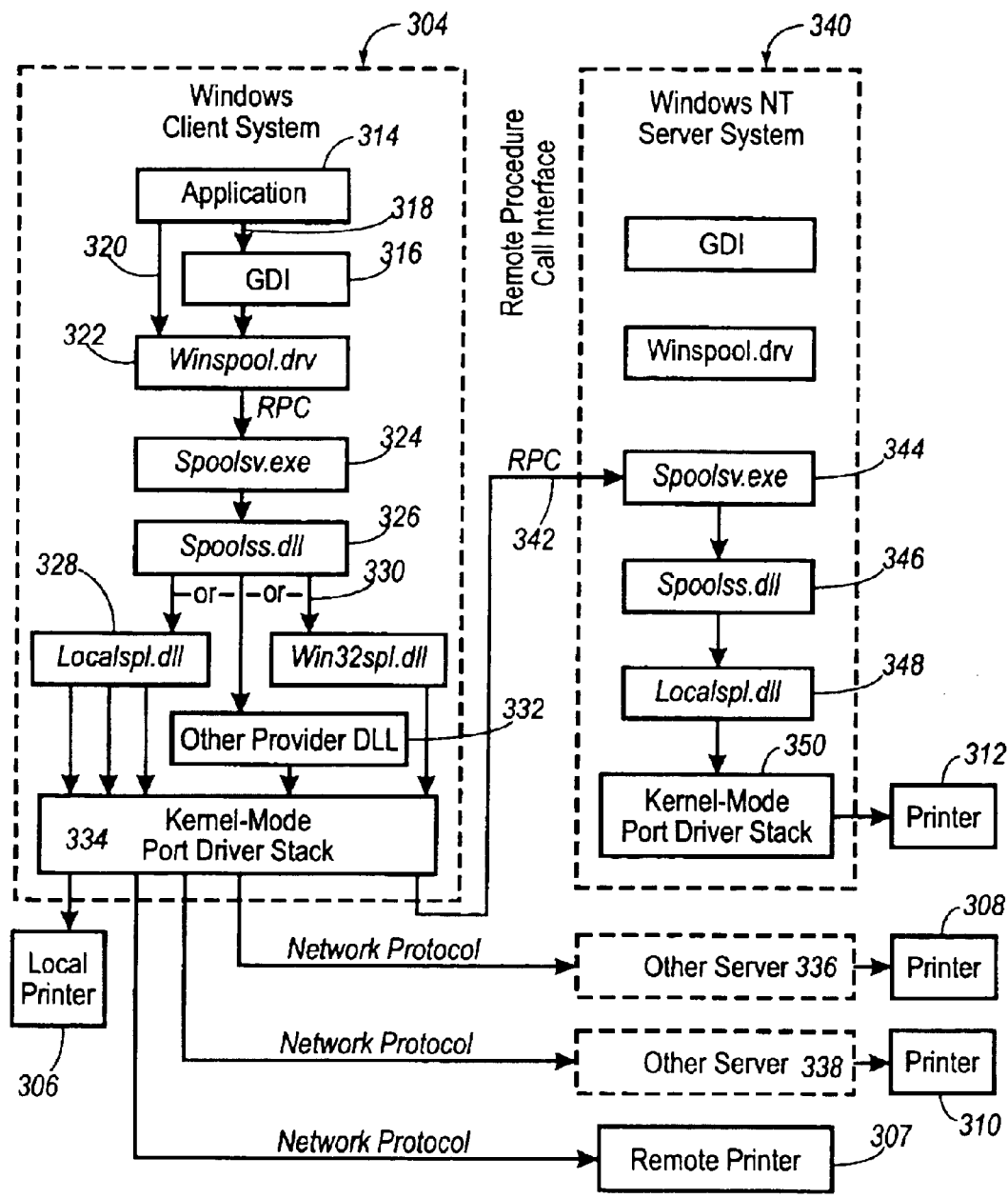
FIG. 3 shows a schematic view of possible data flows in a print provider.

FIG. 3 illustrates possible data flow paths from a Microsoft Windows NT client system 304 to a plurality of printers 306, 308, 310, 312. A detailed description of the Windows NT print server. architecture is provided in the Windows NT DDK which was previously incorporated by reference. An application, 314, typically software that generates text or graphics such as Microsoft Power Point or Microsoft Word creates a document. Application 314 creates a print job by calling a Graphics Driver Interface 316 (GDI) as illustrated by data path 318. Graphics Driver interface 316 creates a spool file. In specialized applications, the application program may directly create spool file without using the GDI as illustrated along data path 320.

Most functions defined by print providers require a printer handle as input. In an example Windows NT operating environment, the client spooler obtains a printer handle by calling a command OpenPrinter in the client Winspool.drv 322. The calling of the OpenPrinter command causes Winspool.drv 322 to call API server 324 (spoolsv.exe). The capabilites of the spooler are defined by the API functions available.

A client spooler router 326 (spoolss.dll in Windows NT) calls each print provider's OpenPrinter function until one of the print providers supplies a printer handle and a return value indicating the print provider recognizes the specified printer name. The printers called may be either local printers, remote printers running Windows NT and remote printers running other operating systems. Local printers are called via a local connection using localspl.dll 328. Windows NT print servers may be called via a remote connection using Win32spl.dll 330. Print servers that utilize non Windows compatible operating systems may be called using other Provider DLLs 332. Examples of Non windows DLLs supported by a Windows NT and/or Windows 2000 client system include, but are not limited to, nwprovau.dll for Novell NetWare print servers and inetpp.dll for HTTP print providers that handle print jobs sent to a URL.

A Kernel-mode or Port Driver stack 334 directs the open printer call from the client system 304 to local printer 306, to remote printer 307, to networked servers 336, 338 coupled to corresponding printers 308, 310, and to Windows NT server system 340 coupled to corresponding printer 312. Windows NT server system 340 receives the remote procedure call interface (RPC) signal 342 from the client system 304 at the remote print server router 344. The printer server router 344 generates its own OpenPrinter function 346 that propagates through server Localspl.dll 348 and the print server Kernel-mode Port Driver Stack 350 to printer 312.

The printer spooler router 344 calls each printer's 312 OpenPrinter function until one of them supplies a printer handle and a return value indicating the print 312 recognizes the specified printer name. The printer spooler router 344 then returns its own handle to the client system 304. The print router handle includes both the printer handle and the print server handle. This print router handle is returned to the application 314. The transferred handles allows application 314 to direct subsequent calls to the correct print server and printer.

Figure 4:
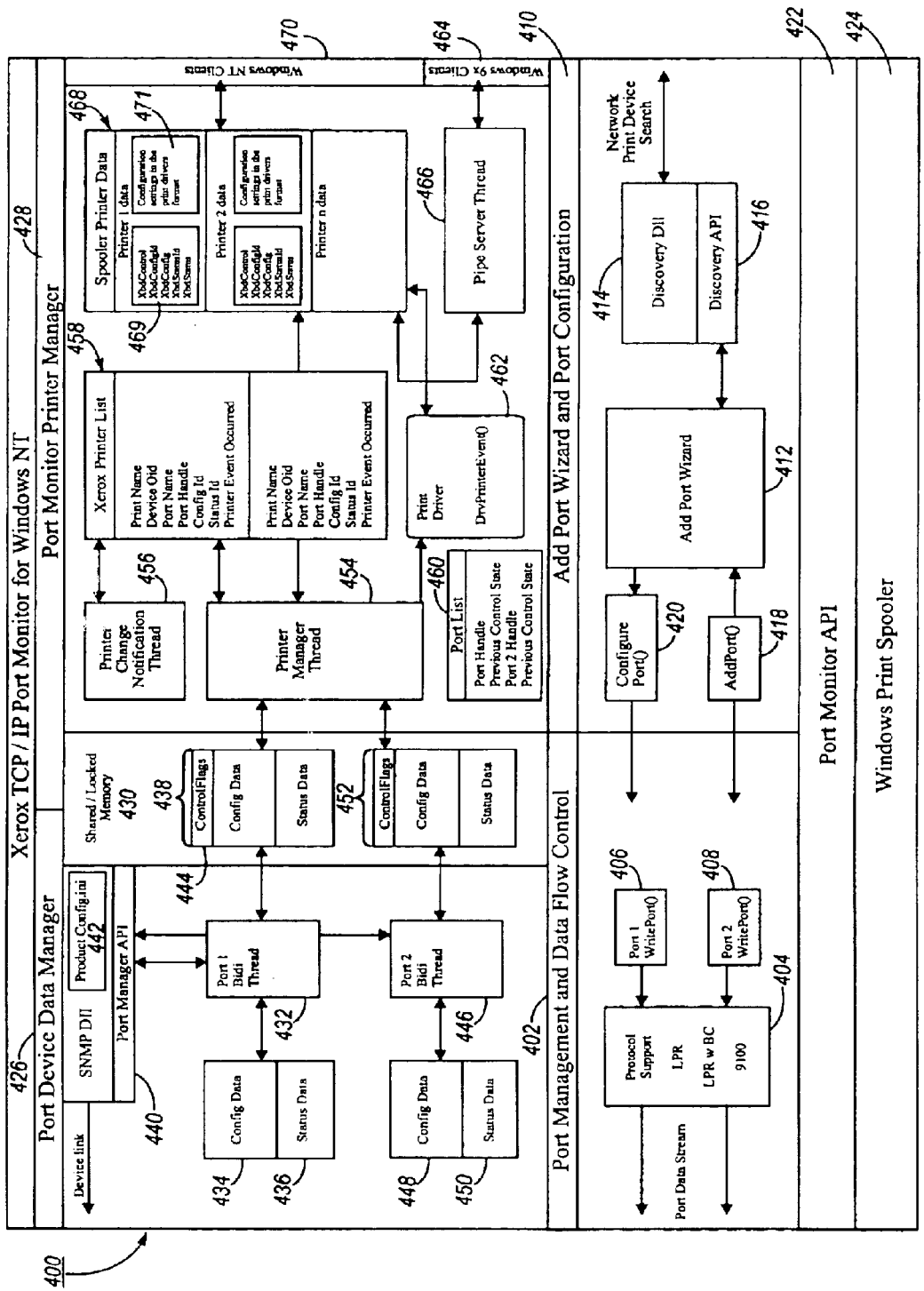
FIG. 4 shows a schematic view of a possible port monitor architecture including possible data flows for use in a Windows operating system.

FIG. 4 shows a port monitor architecture 400 as implemented in one embodiment of the invention. In one embodiment of the invention, a server, using the port monitor of FIG. 4, transmits inquiries regarding printer status and configuration to a printer using a polling method. When a change in printer status or configuration occurs, the port monitor updates stored printer configuration and status data in a registry of the server. Some client operating systems, such as Windows NT utilizes the server registry as the local registry. However, other client operating systems, such as Windows 9x series operating systems including Windows 95 and Windows 98 maintain a separate local registry. In such systems, the client may periodically poll the server to determine printer configuration and/or status changes. When such changes are detected, the client may retrieve the printer configuration or status changes from the server via a server thread.

Block 402 includes protocol support 404 hardware and software that receives streams of print data from each port cell such as a first port 406 and a second port 408. Protocol support 404 converts the data into a print data stream that matches an acceptable printer protocol for output to a printer. Typical IEEE accepted protocols include LPR (Line print protocol), LPR with byte counting and AP Socket 9100 although other protocols may also be possible.

Because the print system is a dynamic system, printers and clients may be added to the network. Block 410 of FIG. 4 includes components used to add ports to the print server. In block 410, Port Wizard software 412 communicates with an auto printer discovery dynamic link library (DLL) 414. Discovery DLL 414 utilizes discovery APIs 416 to determine attached or available printers. After determining available printers, Port Wizard software 412 adds ports using add port subroutine 418. Configure port subroutine 420 properly configures the added ports. When the print spooler 424 is part of an operating system, both the port management software of block 402 and the add port software of block 410 use port monitor application program interfaces (APIs) shown in block 422 to format and transmit requests to the print spooler. When the operating system is a Windows operating system from Microsoft Corporation of Redmond, Wash., the port monitor APIs in block 422 are Microsoft defined APIs used to communicate with the Windows Print Spooler.

In FIG. 4, Port Device Data Manager 426 interfaces with a port monitor printer manager 428. In one embodiment of the invention, both port device data manager 426 and port monitor printer manager 428 are part of a print server that transfers information between a printer and client computers.

Port device data manager 426 includes a shared locked memory 430 that maintains configuration data, status data and control data for each printer coupled to the print server. A port manager API 440 manages communications with a printer using a standard communications protocol such as SNMP. SNMP communication is controlled by a text based file containing printer information. An example of such a text base file is included in FIG. 4 as "product config.ini" 442. A communications network or a corresponding Bidi thread such as first port thread 432 communicates configuration data 434 and status data 436 from the printer to the appropriate memory locations 438 in shared/locked memory 430.

One method of maintaining status and configuration data is to continuously replace the stored configuration data and status data in memory location 438 with newly received configuration data and status data. However, constant retransmission of all printer configuration and status data to all clients consumes excessive network bandwidth. In order to minimize retransmission of configuration and status data from the print server to client devices, changes in configuration data and status data may be summarized by setting appropriate control flags 444 that represent any changes in the configuration or status data. In one embodiment of the invention, shared locked memory 430 also stores the control flags 444.

The described communications network or first port thread 432 may be replicated for each port coupled to a printer. For example, FIG. 4 shows a second port thread 446 that receives corresponding configuration data 448 and status data 450 from a second printer (not shown). A second memory region 452 of shared locked memory 430 maintains the configuration and status data as well as corresponding settings of control flags. The data in second memory region 452 may be used by the print server as well as retransmitted to client computers.

Printer manger 428 includes a multi-tasking printer manger thread 454 that receives data from shared locked memory 430 of device port manager 426. The data may include configuration data, status data and/or control flags. Printer change notification thread 456 tracks changes in printers coupled to respective ports of the print server. When the printer notification thread 456 is implemented in a Microsoft Windows environment, the printer change notification thread 456 may use standard Microsoft APIs to detect printer changes. Port printer manager 428 coordinates information from printer change notification thread 456 and Printer manager thread 454 with available printer data stored in printer list 458 and available port data stored in port list 460. Printers identified in list 458 typically have a corresponding entry in registry 468 corresponding to the printer. Each printer entry in printer list 458 may include, but is not limited to, printer names, device ids, port names, port handles, configuration Ids, status Ids, and printer events. Port list 460 may include, but is not limited to data pertaining to each port such as port handles and previous control states.

Print manager thread 454 summarizes data received from printer list 458, port list 460 and shared locked memory 430 and forwards the summarized data to a summarized data 469 area in printer registry 468. In addition, print manager thread 454 alerts printer driver 462 of the changes. The print driver converts the summarized data 469 to an internal format 471 compatible with the print driver. The internal format data 471 is stored in a corresponding area of printer registry 468, The operation of a typical print driver is described in the Microsoft Windows NT DDK which has been incorporated by reference.

When client 464 is a client that maintains a local print driver and thus does not automatically assume use of a server print driver, (examples of such operating systems include Windows 9x clients referring to clients computers that operate using Microsoft Windows 95 and/or Windows 98) the client 464 requests that pipe server thread 466 retrieve summarized data 469. Pipe server thread 466 may perform or facilitate both client transmission of data request commands as well as pipe server thread 466 generated responses of configuration and status information.

Some clients may utilize operating systems that assume the use of a print server driver as the local driver. One example of such an operating system is a Windows NT operating system. Each Windows NT client, such as client 470, may directly access data from registry 468.

Figure 5:
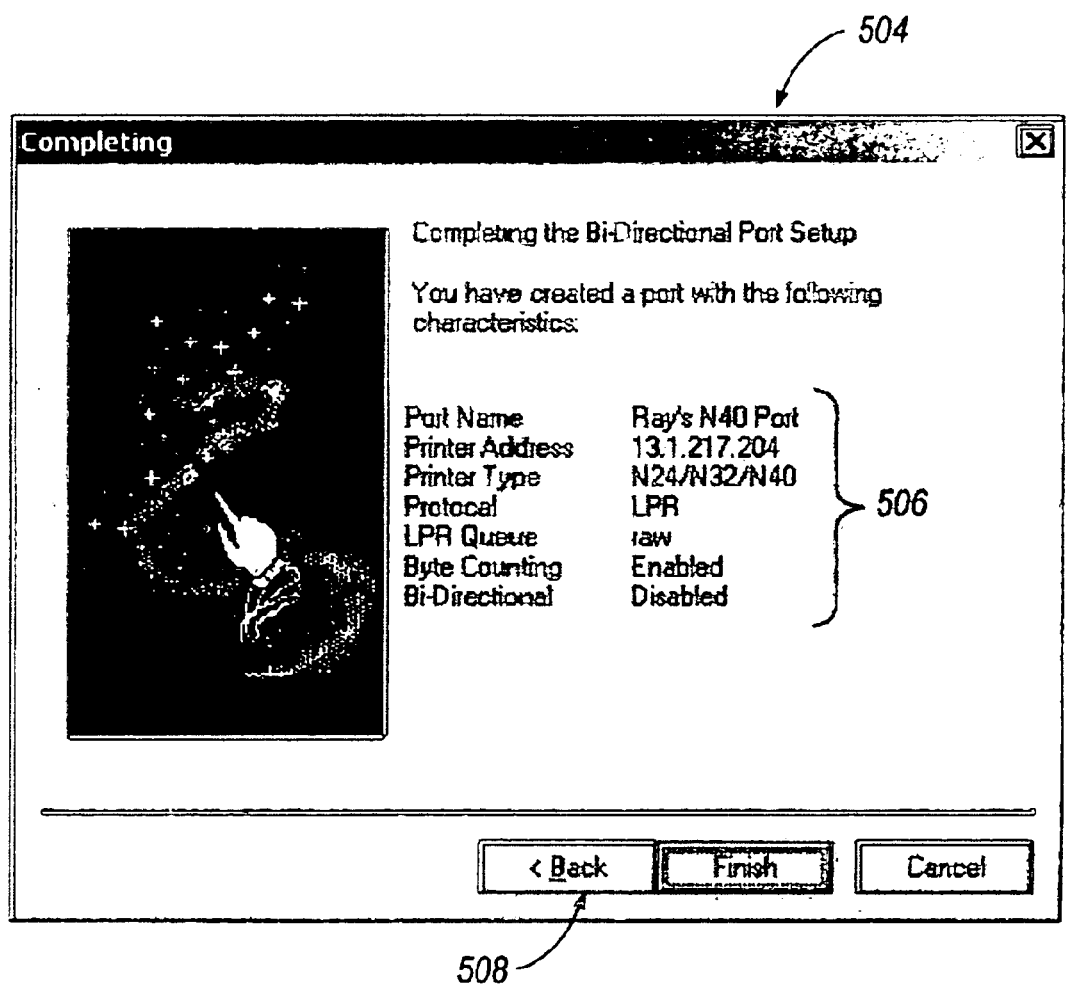
FIG. 5 shows one example of a possible user interface displays for setting up port information and bi-directional communication settings.

FIG. 5 shows one example of a user interface that may be implemented for controlling bidirectional communications. In screen 504, a summary 506 of port setting is provided. Any of these values may be modified by selecting back button 508 to change a selected characteristic. Completion of the port configuration may be achieved by hitting finish button 512.

Figure 6:
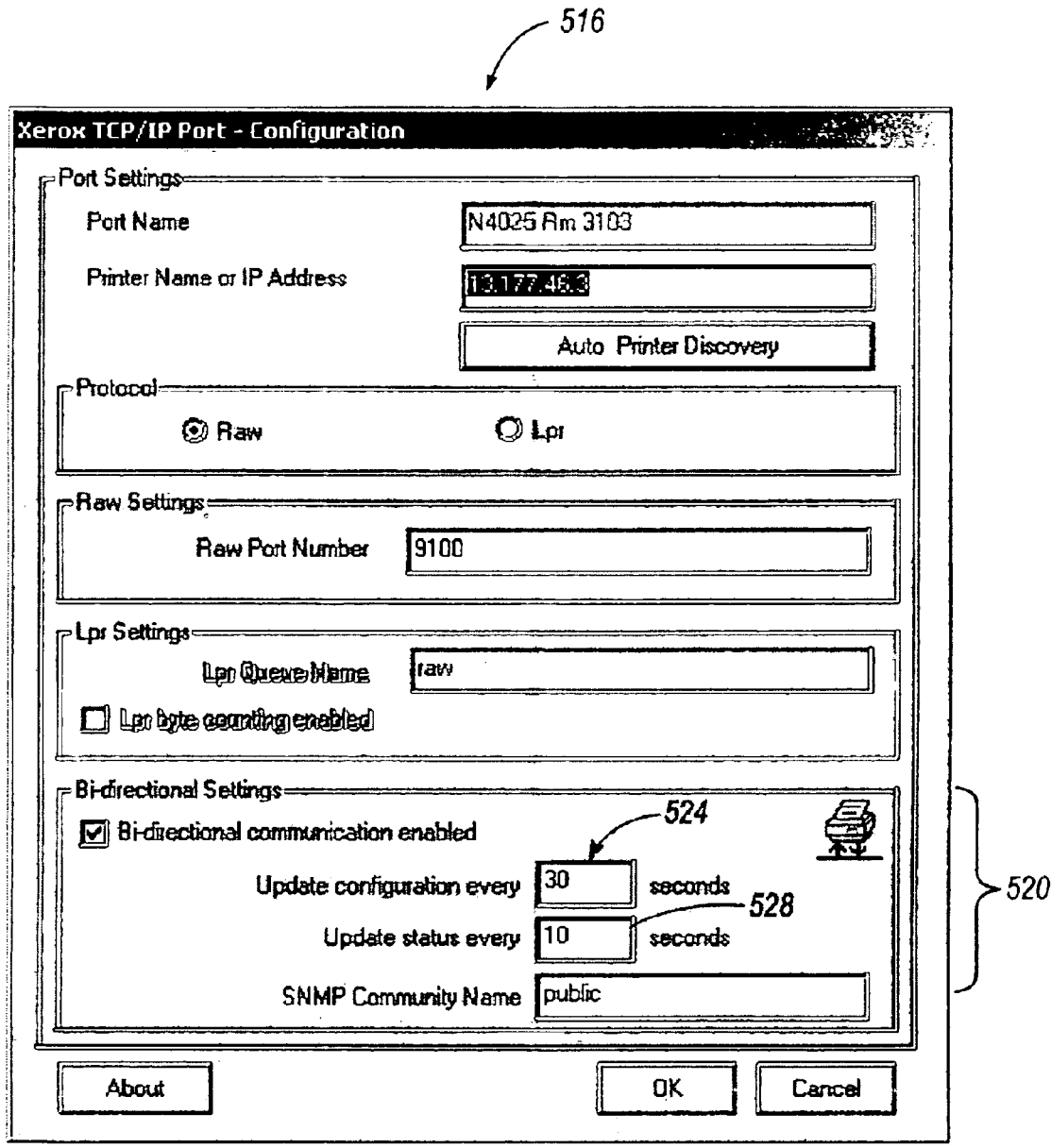
FIG. 6 shows a second example of a possible user interface display for adjusting polling information used in monitoring printer status and configuration data.

Additional details of configuring the port are illustrated in Screen 516 of FIG. 6. Bi-directional settings section 520 of screen 516 allow users to enable or disable bi-directional communications. Screen 516 also allows user defined timer intervals between printer configuration updates and printer status updates by filling in the corresponding time interval boxes 524, 528.

It will be appreciated that the foregoing description is intended to be illustrative. Variations and modifications of the descriptions provided herein will present themselves to those skilled in the art. For example, the focus of the descriptions has been on the transfer of data between printers and clients running specific Windows operating systems. However, other operating systems which use architecture similar to the described operating systems may also implement the described invention. As a further example, different types of printer data besides the examples of printer status and printer configuration data described may be transferred. Accordingly, the present description should not be read as limiting the scope of the claims except and unless indicated to the contrary.

What is claimed is:

1. A method of updating a print driver in a print server comprising the operations of:

gathering printer configuration data from a printer at a printer port;

monitoring the incoming printer configuration data for changes;

recognizing the changes in configuration data;

waking an installed server print driver and alerting the server print driver of changes in configuration data to allow the print driver to convert the configuration data to an internal format; and, saving the changes in configuration data in a spooler registry.

2. The method of claim 1 wherein a printer manager thread of the print server performs the operation of alerting the server printer driver.

3. The method of claim 1 wherein the monitoring operation further comprises:

polling a printer to periodically gather new printer configuration data; and comparing data gathered in the polling operation with stored printer configuration data.

4. The method of claim 3 wherein the monitoring operation further comprises:

setting flags when the comparing operation determines that the new printer configuration data does not match the stored configuration data; and waking a print driver to make a configuration change that matches the set flag.

5. The method of claim 1 wherein the waking operation is executed by transmitting a print driver event API defined by a computer Operating System.

6. A method of updating a print driver in a client device comprising the operations of:

gathering summarized printer data from a printer at a printer port of a print server;

monitoring the incoming printer configuration data at the print server for changes in the configuration data; and, updating a print server registry of the print server when a change in summarized configuration data occurs.

7. The method of claim 6 wherein the client and server have the same operating system print spooling characteristics.

8. The method of claim 6 wherein a client that maintains a local client registry requests via a pipe server thread the transfer of summarized printer data to the client device.

9. The method of claim 6 further comprising the operation of updating a client device print registry when a change in summarized printer data occurs.

10. The method of claim 6 wherein the transferring operation occurs using a server thread that determines configuration options from the server registry and transfers the configuration options to the client device.

11. The method of claim 10 wherein the transfer of the configuration options occurs using an operating systems object.

12. The method of claim 6 wherein the summarized printer data is printer configuration data.

13. The method of claim 6 wherein the summarized printer data is printer status data.

14. A system to output printed documents comprising:

a printer to convert electronic signals into a printed document, the printer having a configuration state that corresponds to a particular period in time;

a first client device that receives an input and transmits print signals to define a document to be printed on the printer, the first client including a local print registry that maintains the configuration states of the printer;

a second client device that receives a second input and transmits print signals to define a second document to be printed on the printer;

a print server coupled to the first client device and the second client device, the print server including a print server registry that maintains the configuration states of the printer; and, software running on the print server, the software including a first code section that periodically polls the printer and compares results from the poll to the server registry to determine changes in configuration states, the software further including a second code section that transmits the changes in configuration states to the first client device and the second client device.

15. The system of claim 14 wherein data in the print server registry is regularly transferred to the local registry of the first client and a second local registry of the second client.

16. The system of claim 14 wherein the transfers occur when polling of the first client and polling by the second client determines that a change in configuration states of the printer has occurred.

17. The system of claim 14 wherein the print server runs software that conforms to a computer operating system and uses a pipe server thread that transfer the changes in configuration states from the printer to the client device.

18. The system of claim 14 wherein the print server operates a first operating system and the second client device operates a second operating system that uses the server print registry as a local registry.

19. The system of claim 14 wherein the print server includes a driver that receives notice of changes in printer configuration states and updates the print server registry.

20. A method to output printed documents from a printer in response to a client device, the printer changing between configuration states, the method comprising:

operating a server to repeatedly poll the printer and compare results with the server's stored printer configuration information to detect change between configuration states;

operating the server to transmit to the client device a detected change between configuration states; and providing an input to the client device, the input causing the client device to transmit print signals to the printer in accordance with the detected change between configuration states; the printer responding to the print signals by printing a document.

21. A method of automatically updating a client device's stored printer configuration data, the method comprising:

operating a server to detect a change in a printer's configuration and to update the server's stored printer configuration data when the printer changes configuration; and using the server's updated printer configuration data to update the client device's stored printer configuration data.

22. A method of automatically updating a client device's stored data about a printers configuration and status, the method comprising:

operating a server to detect a change in the printer's configuration or status and to update the server's stored data about the printer's configuration and status when the printer changes configuration or status;

using the server's updated stored data to provide printer configuration and status data to the client device; and operating the client device to update the client device's stored data about the printer's configuration and status using the printer configuration and status data.

23. A method of automatically updating a client device when change occurs in a printer's configuration or status, the method comprising:

operating a server to detect a change in the printer's configuration or status and to set control flags indicating the change; and operating the client device to provide instructions to the printer in accordance with the control flag settings.

24. A method of automatically updating a client device about a printer's configuration and status, the method comprising:

operating a server to update the server's stored data about the printer's configuration and status; and operating the client device to periodically poll the server to obtain information about change in at least one of the printer's configuration and the printer's status.

25. A method of automatically updating a client device about a printer, the client device and printer communicating through a server, the method comprising:

periodically transmitting a request signal to the printer; each request signal transmission causing the printer to provide a respective response signal with information about at least one of the printer's configuration and the printer's status;

using the response signals to detect a change in the printer's configuration or status; and updating the client device with the detected change in the printer's configuration or status.

* * * * *